US012759590B2

(12) United States Patent
Kondapally et al.

(10) Patent No.: US 12,759,590 B2
(45) Date of Patent: Oct. 13, 2026

(54) INFORMATION PROCESSING APPARATUS, MOBILE OBJECT, CONTROL METHOD THEREOF, AND STORAGE MEDIUM FOR CAUSING MOBILE DEVICE TO MOVE TO MEETING LOCATION WITH USER

(71) Applicant: HONDA MOTOR CO., LTD., Tokyo (JP)

(72) Inventors: Anirudh Reddy Kondapally, Wako (JP); Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/952,417

(22) Filed: Nov. 19, 2024

(65) Prior Publication Data

US 2025/0074472 A1 Mar. 6, 2025

Related U.S. Application Data

(63) Continuation of application No. 17/704,716, filed on Mar. 25, 2022, now Pat. No. 12,179,801.

(30) Foreign Application Priority Data

Mar. 31, 2021 (JP) ................................ 2021-061595

(51) Int. Cl.
*B60W 60/00* (2020.01)
*G06V 20/52* (2022.01)
(Continued)

(52) U.S. Cl.
CPC ....... *B60W 60/00253* (2020.02); *G06V 20/52* (2022.01); *G06V 20/64* (2022.01);
(Continued)

(58) Field of Classification Search
CPC . B60W 60/00253; G06Q 50/43; G06Q 50/47; G01C 21/3438; G08G 1/202
See application file for complete search history.

(56) References Cited

U.S. PATENT DOCUMENTS 9,026,363 B2 5/2015 Iketani
11,648,964 B2 5/2023 Uehara et al.
(Continued)

FOREIGN PATENT DOCUMENTS

CN 110290583 A 9/2019
CN 110672107 A 1/2020
(Continued)

OTHER PUBLICATIONS

Machine translation of the Office Action dated Apr. 24, 2025, concerning Chinese Patent Application No. 202210285709.5.
(Continued)

*Primary Examiner* — Kenneth J Malkowski
(74) *Attorney, Agent, or Firm* — THOMAS | HORSTEMEYER, LLP

(57) ABSTRACT

An information processing apparatus of the present invention acquires, from a communication device of a user, at least one of utterance information by the user and position information of the communication device, specifies a predetermined region according to a mark included in the utterance information; acquires a movement direction of the user from at least one of the utterance information and the position information acquired from the communication device of the user, and setting a probability distribution that the user exists to a divided region of the predetermined region based on the acquired movement direction of the user; and presumes the user based on the set probability distribution.

6 Claims, 12 Drawing Sheets

(51) Int. Cl.

| | |
|---|---|
| ***G06V 20/64*** | (2022.01) |
| ***G06V 40/10*** | (2022.01) |
| ***G06V 40/20*** | (2022.01) |
| ***G10L 15/16*** | (2006.01) |
| ***G10L 15/22*** | (2006.01) |
| ***H04W 4/029*** | (2018.01) |
| ***H04W 4/40*** | (2018.01) |

(52) U.S. Cl.

CPC .............. *G06V 40/10* (2022.01); *G06V 40/25* (2022.01); *G10L 15/16* (2013.01); *G10L 15/22* (2013.01); *H04W 4/029* (2018.02); *H04W 4/40* (2018.02); *B60W 2300/34* (2013.01); *B60W 2540/041* (2020.02); *G06V 2201/07* (2022.01); *G10L 2015/228* (2013.01)

(56) References Cited

U.S. PATENT DOCUMENTS

| | | | | |
|---|---|---|---|---|
| 11,912,309 | B2 | 2/2024 | Uehara et al. | |
| 11,946,754 | B2 | 4/2024 | Migita | |
| 2014/0067262 | A1 | 3/2014 | Iketani | |
| 2016/0183060 | A1 | 6/2016 | Seyde et al. | |
| 2020/0103523 | A1* | 4/2020 | Liu | G01S 13/87 |
| 2020/0143458 | A1 | 5/2020 | Ikeda et al. | |
| 2020/0166366 | A1 | 5/2020 | Herman et al. | |
| 2020/0262454 | A1 | 8/2020 | Uehara et al. | |
| 2022/0097734 | A1* | 3/2022 | Limaye | G06V 20/56 |
| 2022/0295017 | A1 | 9/2022 | Shimotani | |
| 2023/0119887 | A1 | 4/2023 | Uehara et al. | |

FOREIGN PATENT DOCUMENTS

| | | | |
|---|---|---|---|
| CN | 111835851 | A | 10/2020 |
| CN | 112219217 | A | 1/2021 |
| JP | 2020-038071 | A | 3/2020 |
| JP | 2020-077035 | A | 5/2020 |
| JP | 2020-154492 | A | 9/2020 |
| JP | 2021006958 | A | 1/2021 |
| JP | 2021-043763 | A | 3/2021 |
| WO | 2014/038041 | A1 | 3/2014 |

OTHER PUBLICATIONS

Chinese Office Action for Chinese Patent Application No. 202210285709.5 mailed Oct. 1, 2025 (partially translated).

Japanese Office Action for Japanese Patent Application No. 2021061595 mailed May 7, 2024 (partially translated).

* cited by examiner

INFORMATION PROCESSING APPARATUS, MOBILE OBJECT, CONTROL METHOD THEREOF, AND STORAGE MEDIUM FOR CAUSING MOBILE DEVICE TO MOVE TO MEETING LOCATION WITH USER

CROSS-REFERENCE TO RELATED APPLICATION(S)

This application is a continuation of, and claims priority to, U.S. patent application Ser. No. 17/704,716 filed on Mar. 25, 2022, entitled "INFORMATION PROCESSING APPARATUS, MOBILE OBJECT, CONTROL METHOD THEREOF, AND STORAGE MEDIUM," which, in turn, claims priority to and the benefit of Japanese Patent Application No. 2021-061595 filed on Mar. 31, 2021, entitled "INFORMATION PROCESSING APPARATUS, MOBILE OBJECT, CONTROL METHOD THEREOF, AND STORAGE MEDIUM," the entire disclosure of both of these documents being incorporated herein by reference.

BACKGROUND OF THE INVENTION

Field of the Invention

The present invention relates to an information processing apparatus, a mobile object, a control method thereof, and a storage medium.

Description of the Related Art

In recent years, an electric vehicle (mobile object) called an ultra-compact mobility vehicle (also referred to as a micro mobility vehicle) having a riding capacity of about one or two persons is known, and is expected to spread as an easy movement mechanism.

A car sharing system using the ultra-compact mobility vehicle for sharing is proposed (for example, Japanese Patent Laid-Open No. 2020-77035). In the car sharing system, a vehicle management server receives a use application message including a use start time and a renting place of a vehicle (mobile object) to be a car sharing target from a communication device of a user. Then, a transport vehicle that can arrive at the renting place by the use start time is specified based on the content of the use application message and current positions of transport vehicles, and the specified transport vehicle is caused to transport the sharing car to the renting place. If the user visits the renting place at the designated use start time, the user can use the sharing car.

Incidentally, in a case where the user uses the ultra-compact mobility vehicle, a use case is conceivable in which the user does not visit a renting place where the ultra-compact mobility vehicle is kept but the ultra-compact mobility vehicle and the user dynamically adjust a meeting position at which the user and the vehicle are to meet while moving. Such a use case is effective in a case where it is difficult for the user to meet up with the vehicle at a previously designated position due to congestion or the like, a case where the user first designates a rough area, a building, or the like and adjusts a specific meeting position at a stage where the user and the mobility vehicle get close to each other, and the like.

SUMMARY OF THE INVENTION

The present invention has been made in view of the above problems, and an object thereof is to suitably presume a person to be a user. Further, another object of the present invention is to adjust a meeting position between a presumed user and a mobile object.

According to one aspect of the present invention, there is provided an information processing apparatus comprising: a first acquisition unit configured to acquire, from a communication device of a user, at least one of utterance information by the user and position information of the communication device; a specification unit configured to specify a predetermined region according to a mark included in the utterance information; a setting unit configured to acquire a movement direction of the user from at least one of the utterance information and the position information acquired from the communication device of the user, and set a probability distribution that the user exists to the predetermined region based on the acquired movement direction of the user; and a presumption unit configured to presume the user based on the set probability distribution.

According to another aspect of the present invention, there is provided a mobile object comprising: a communication unit configured to communicate with a communication device of a user; an imaging unit configured to image a surrounding portion of the mobile object; a first acquisition unit configured to acquire, from the communication device of the user and by the communication unit, at least one of utterance information by the user and position information of the communication device; a specification unit configured to specify a predetermined region according to a mark included in the utterance information; a setting unit configured to acquire a movement direction of the user from at least one of the utterance information and the position information acquired from the communication device of the user, and set a probability distribution that the user exists to a divided region of the predetermined region based on the acquired movement direction of the user; and a presumption unit configured to presume the user based on the set probability distribution.

Further features of the present invention will become apparent from the following description of exemplary embodiments (with reference to the attached drawings).

DESCRIPTION OF THE EMBODIMENTS

Figure 1:
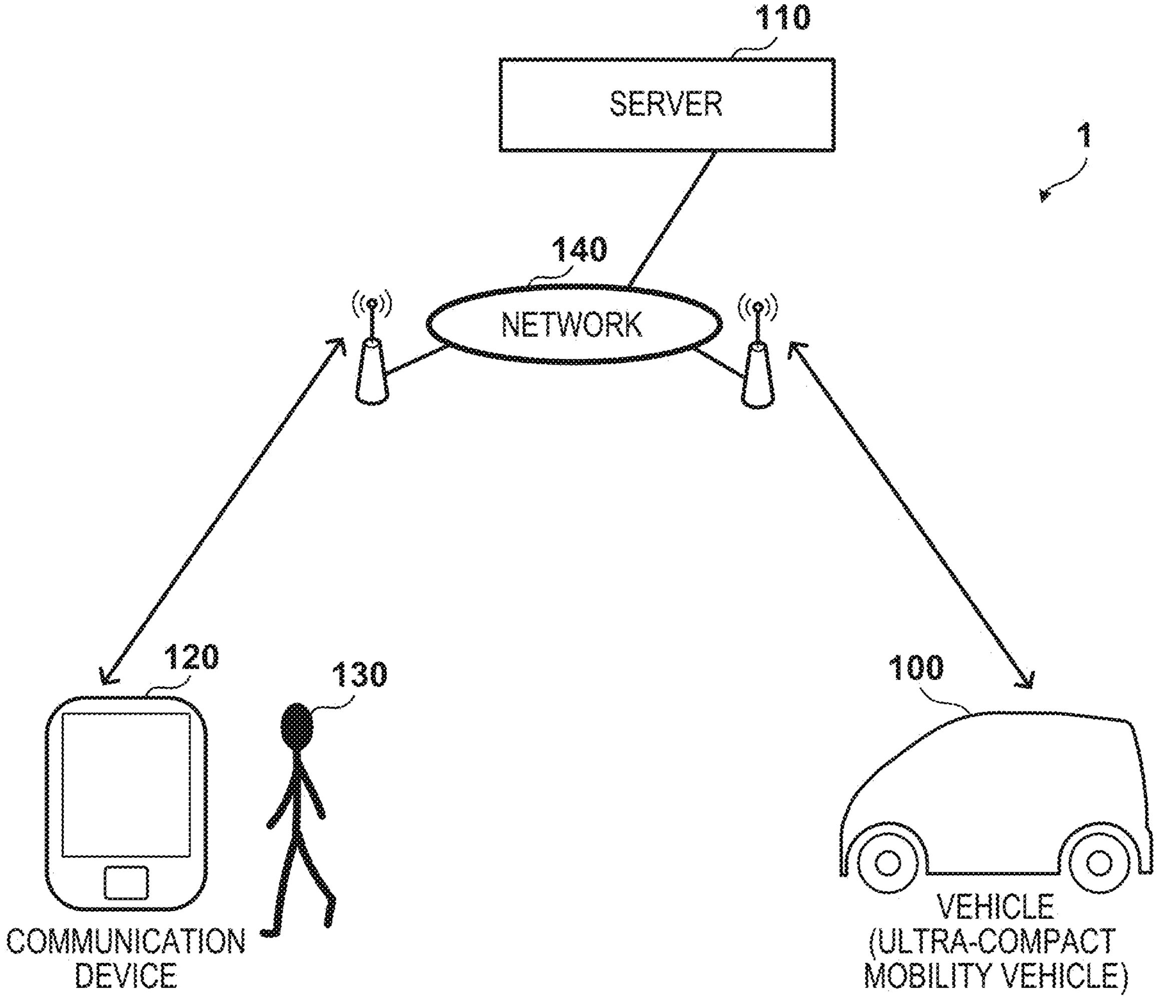
FIG. 1 is a diagram illustrating an example of an information processing system according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Configuration of Information Processing System>

A configuration of an information processing system 1 according to the present embodiment will be described with reference to FIG. 1. The information processing system 1 includes a vehicle (mobile object) 100, a server 110, and a communication device (communication terminal) 120. In the present embodiment, the server 110 presumes a user 130 by using utterance information of the user and a captured image around the vehicle 100, and further presumes a meeting position to allows the user to meet with the vehicle 100. The user communicates with the server 110 via a predetermined application started on the held communication device 120, and moves to a meeting position (for example, a red post serving as a nearby mark) designated by the user while providing the user's own position and the like by utterance. The server 110 controls the vehicle 100 to move to the presumed meeting position, while presuming the user and the meeting position. Each configuration will be described in detail below.

The vehicle 100 is equipped with a battery, and is, for example, an ultra-compact mobility vehicle that moves mainly by the power of a motor. The ultra-compact mobility vehicle is an ultra-compact vehicle that is more compact than a general automobile and has a riding capacity of about one or two persons. In the present embodiment, an example in which the vehicle 100 is the ultra-compact mobility vehicle will be described, but there is no intention to limit the present invention, and for example, a four-wheeled vehicle or a straddle type vehicle may be used. Further, the vehicle of the present invention is not limited to a vehicle, and may be a vehicle loaded with luggage and traveling alongside a person who is walking, or a vehicle leading a person. Furthermore, the present invention is not limited to a four-wheeled or two-wheeled vehicle, and a walking type robot or the like capable of autonomous movement can also be applied. That is, the present invention can be applied to mobile objects such as these vehicles and walking type robots, and the vehicle 100 is an example of the mobile object.

The vehicle 100 is connected to a network 140 via wireless communication such as Wi-Fi or 5th generation mobile communication. The vehicle 100 can measure states inside and outside the vehicle (a vehicle position, a traveling state, a target of a surrounding object, and the like) by various sensors and transmit measured data to the server 110. The data collected and transmitted as described above is also generally referred to as floating data, probe data, traffic information, or the like. The information on the vehicle is transmitted to the server 110 at regular intervals or in response to an occurrence of a specific event. The vehicle 100 can travel by automated driving even when the user 130 is not in the vehicle. The vehicle 100 receives information such as a control command provided from the server 110 or uses data measured by the self-vehicle to control the operation of the vehicle.

The server 110 is an example of an information processing apparatus, and includes one or more server devices and is capable of acquiring information regarding the vehicle transmitted from the vehicle 100 and utterance information and position information transmitted from the communication device 120 via the network 140 and controlling traveling of the vehicle 100. The traveling control of the vehicle 100 includes adjustment processing of a meeting position of the user 130 and the vehicle 100 described later.

The communication device 120 is, for example, a smartphone, but is not limited thereto, and may be an earphone type communication terminal, a personal computer, a tablet terminal, a game machine, or the like. The communication device 120 is connected to the network 140 via wireless communication such as Wi-Fi or 5th generation mobile communication.

The network 140 includes, for example, a communication network such as the Internet or a mobile phone network, and transmits information between the server 110 and the vehicle 100 or the communication device 120. In the information processing system 1, in a case where the user 130 and the vehicle 100 at distant places approach each other to such an extent that a target or the like (serving as a visual mark) can be visually confirmed, the meeting position is adjusted using the utterance information and the image information captured by the vehicle 100. Note that, in the present embodiment, an example in which a camera that images a surrounding portion of the vehicle 100 is provided in the vehicle 100 will be described, but it is not always necessary to provide the camera or the like in the vehicle 100. For example, an image captured using a monitoring camera or the like already installed around the vehicle 100 may be used, or both cases may be used. As a result, when the position of the user is specified, an image captured at a more optimum angle can be used. For example, when the user utters what positional relation the user is in with respect to one mark, by analyzing an image captured by a camera close to the position predicted as the mark, it is possible to more accurately specify the user who requests to meet with the ultra-compact mobility vehicle.

Before the user 130 and the vehicle 100 come close to the extent that the target or the like can be visually confirmed, first, the server 110 moves the vehicle 100 to a general area including the current position of the user or the predicted position of the user. Then, when the vehicle 100 reaches the rough area, the server 110 transmits, to the communication device 120, voice information (for example, "Is there a store nearby?" or "What do you see in the direction of travel?") asking about a place related to the visual mark, and the like. The place related to the visual mark includes, for example, a name of the place included in the map information. Here, the visual mark indicates a physical object that can be visually recognized by the user, and includes, for example, various objects such as a building, a traffic light, a river, a mountain, a bronze statue, and a signboard. The server 110 receives, from the communication device 120, utterance information (for example, "There is a building of xx coffee shop") by the user including the place related to the visual mark. Then, the server 110 acquires a position of the corresponding place from the map information, and moves the vehicle 100 to the vicinity of the place (that is, the vehicle and the user come close to the extent that the target or the like can be visually confirmed). Note that, in a case where the position cannot be specified from the map information, for example, in a case where there is a plurality of candidate positions, it is also possible to narrow down the candidate positions by asking an additional question.

<Configuration of Mobile Object>

Figure 2A:
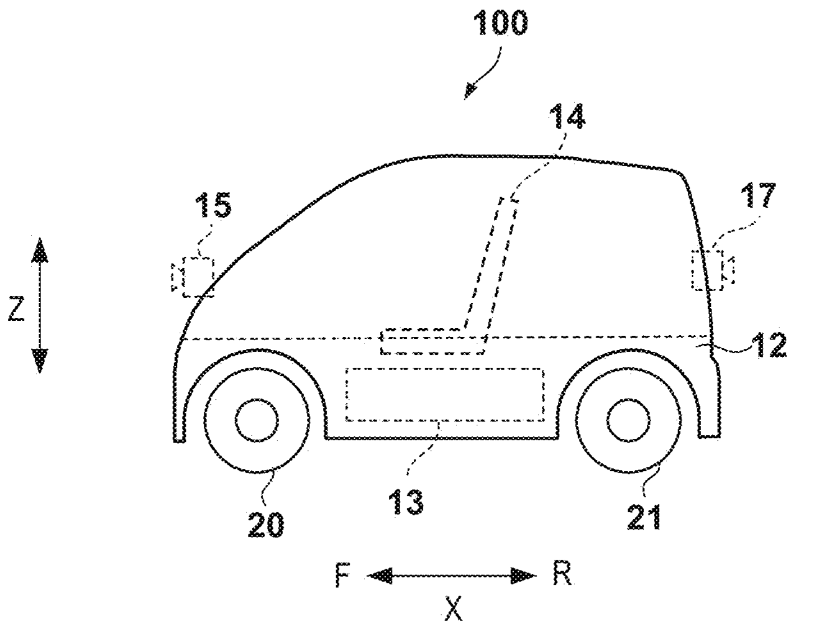
FIGS. 2A and 2B are block diagrams illustrating a hardware configuration example of a mobile object according to the present embodiment.
Figure 2B:
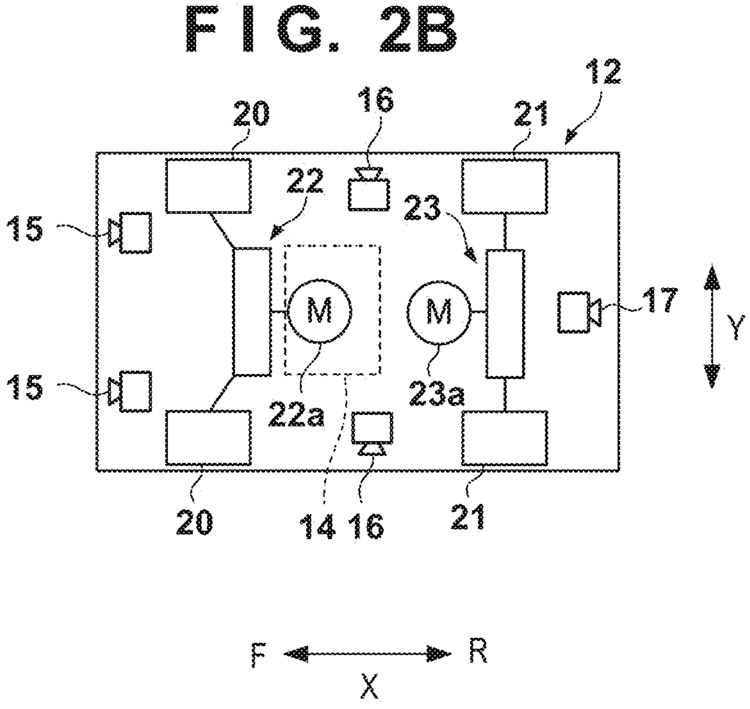

Next, a configuration of the vehicle 100 as an example of the mobile object according to the present embodiment will be described with reference to FIGS. 2A and 2B. FIG. 2A illustrates a side surface of the vehicle 100 according to the present embodiment, and FIG. 2B illustrates an internal configuration of the vehicle 100. In the drawings, an arrow X indicates a longitudinal direction of the vehicle 100, F indicates the front, and R indicates the rear. Arrows Y and Z indicate a width direction (lateral direction) and a vertical direction of the vehicle 100, respectively.

The vehicle 100 is an electric autonomous vehicle including a traveling unit 12 and using a battery 13 as a main power supply. The battery 13 is, for example, a secondary battery such as a lithium ion battery, and the vehicle 100 autonomously travels by the traveling unit 12 by electric power supplied from the battery 13. The traveling unit 12 is a four-wheeled vehicle including a pair of left and right front wheels 20 and a pair of left and right rear wheels 21. The traveling unit 12 may be in another form such as a form of a three-wheeled vehicle. The vehicle 100 includes a seat 14 for one person or two persons.

The traveling unit 12 includes a steering mechanism 22. The steering mechanism 22 is a mechanism that changes a steering angle of the pair of front wheels 20 using a motor 22*a* as a driving source. The traveling direction of the vehicle 100 can be changed by changing the steering angle of the pair of front wheels 20. The traveling unit 12 further includes a driving mechanism 23. The driving mechanism 23 is a mechanism that rotates the pair of rear wheels 21 using a motor 23*a* as a driving source. The vehicle 100 can be moved forward or backward by rotating the pair of rear wheels 21.

The vehicle 100 includes detection units 15 to 17 that detect targets around the vehicle 100. The detection units 15 to 17 are a group of external sensors that monitors the surroundings of the vehicle 100, and in the case of the present embodiment, each of the detection units 15 to 17 is an imaging device that captures an image of the surroundings of the vehicle 100 and includes, for example, an optical system such as a lens and an image sensor. However, instead of or in addition to the imaging device, a radar or a light detection and ranging (LiDAR) can be adopted.

The two detection units 15 are disposed on front portions of the vehicle 100 in a state of being separated from each other in a Y direction, and mainly detect targets in front of the vehicle 100. The detection units 16 are disposed on a left side portion and a right side portion of the vehicle 100, respectively, and mainly detect targets on sides of the vehicle 100. The detection unit 17 is disposed on a rear portion of the vehicle 100, and mainly detects targets behind the vehicle 100.

<Control Configuration of Mobile Object>

Figure 3:
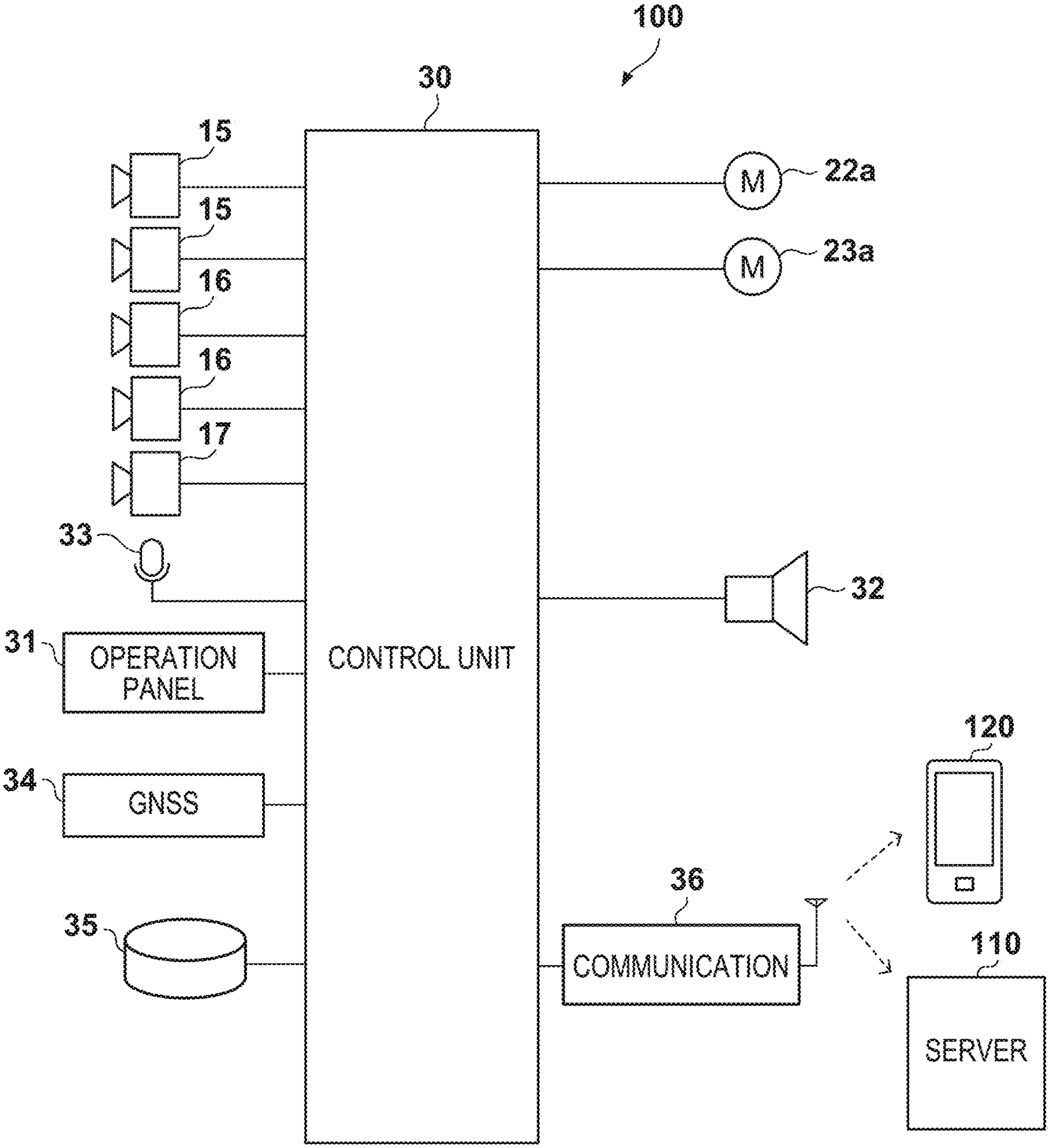
FIG. 3 is a block diagram illustrating a functional configuration example of the mobile object according to the present embodiment.

FIG. 3 is a block diagram of a control system of the vehicle 100 that is the mobile object. Here, a configuration necessary for carrying out the present invention will be mainly described. Therefore, other configurations may be further included in addition to the configuration described below. The vehicle 100 includes a control unit (ECU) 30. The control unit 30 includes a processor represented by a central processing unit (CPU), a storage device such as a semiconductor memory, an interface with an external device, and the like. In the storage device, programs executed by the processor, data used for processing by the processor, and the like are stored. A plurality of sets of processors, storage devices, and interfaces may be provided for each function of the vehicle 100 so as to be able to communicate with each other.

The control unit 30 acquires detection results of the detection units 15 to 17, input information of an operation panel 31, voice information input from a voice input device 33, a control command (for example, transmission of a captured image or a current position, or the like) from the server 110, and the like, and executes corresponding processing. The control unit 30 performs control of the motors 22*a* and 23*a* (traveling control of the traveling unit 12), display control of the operation panel 31, notification to an occupant of the vehicle 100 by voice, and output of information.

The voice input device 33 can collect a voice of the occupant of the vehicle 100. The control unit 30 can recognize the input voice and execute corresponding processing. A global navigation satellite system (GNSS) sensor 34 receives a GNSS signal and detects a current position of the vehicle 100. A storage device 35 is a mass storage device that stores map data and the like including information regarding a traveling road on which the vehicle 100 can travel, landmarks such as buildings, stores, and the like. In the storage device 35, programs executed by the processor, data used for processing by the processor, and the like may be stored. The storage device 35 may store various parameters (for example, learned parameters of a deep neural network, hyperparameters, and the like) of a machine learning model for voice recognition or image recognition executed by the control unit 30. A communication unit 36 is, for example, a communication device that can be connected to the network 140 via wireless communication such as Wi-Fi or 5th generation mobile communication.

<Configurations of Server and Communication Device>

Figure 4:
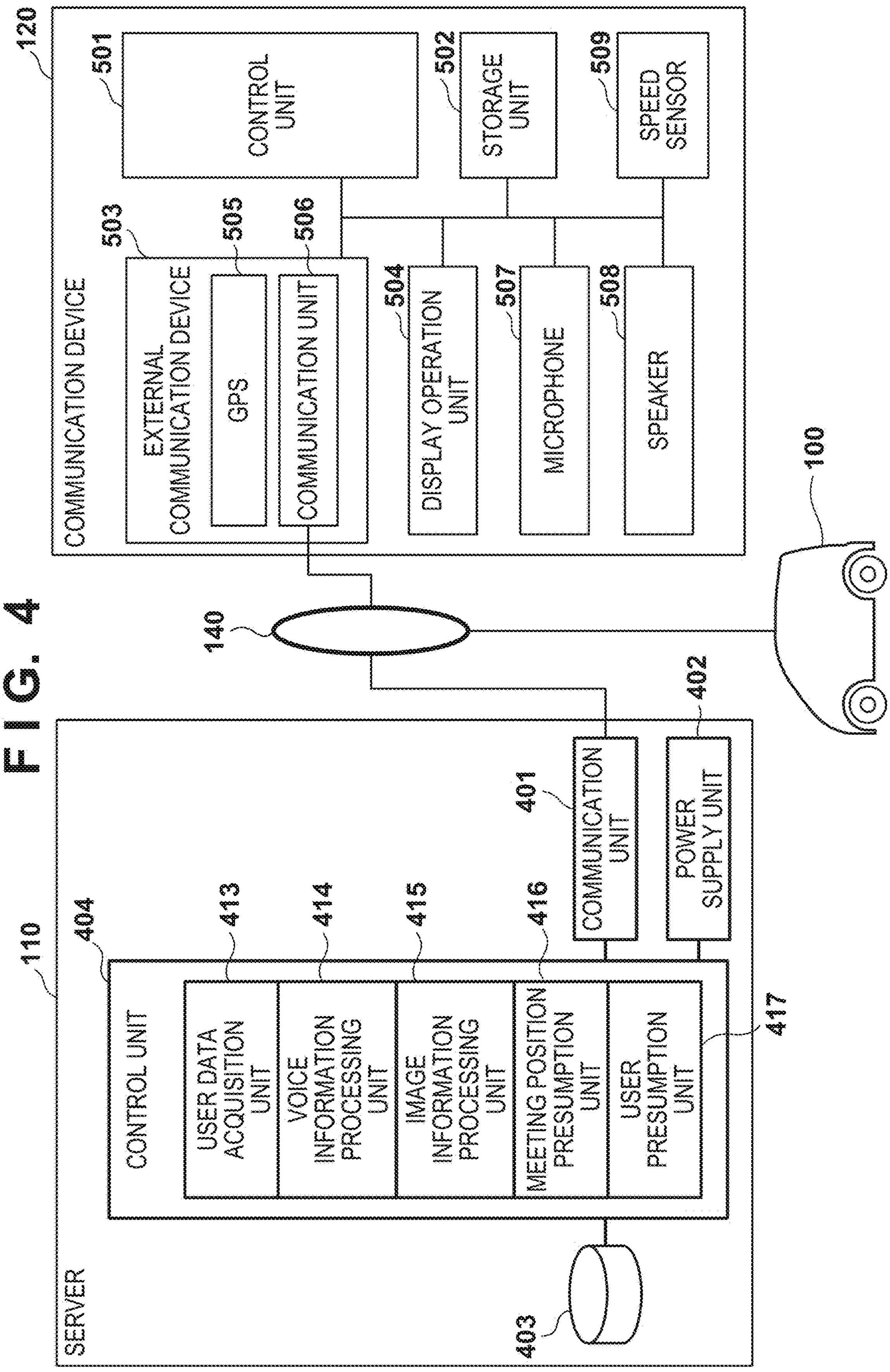
FIG. 4 is a block diagram illustrating configuration examples of a server and a communication device according to the present embodiment.

Next, configuration examples of the server 110 and the communication device 120 as an example of the information processing apparatus according to the present embodiment will be described with reference to FIG. 4.

(Configuration of Server)

First, a configuration example of the server 110 will be described. Here, a configuration necessary for carrying out the present invention will be mainly described. Therefore, other configurations may be further included in addition to the configuration described below. A control unit 404 includes a processor represented by a CPU, a storage device such as a semiconductor memory, an interface with an external device, and the like. In the storage device, programs executed by the processor, data used for processing by the processor, and the like are stored. A plurality of sets of processors, storage devices, and interfaces may be provided for each function of the server 110 so as to be able to communicate with each other. The control unit 404 executes various operations of the server 110, meeting position adjustment processing described later, and the like by executing the program. In addition to the CPU, the control unit 404 may further include a graphical processing unit (GPU) or dedicated hardware suitable for executing processing of a machine learning model such as a neural network.

A user data acquisition unit 413 acquires information of an image and a position transmitted from the vehicle 100. Further, the user data acquisition unit 413 acquires at least one of the utterance information of the user 130 and the position information of the communication device 120 transmitted from the communication device 120. The user data acquisition unit 413 may store the acquired image and position information in the storage unit 403. The information of the image and the utterance acquired by the user data acquisition unit 413 is input to a learned model in an inference stage in order to obtain an inference result, but may be used as learning data for learning the machine learning model executed by the server 110.

A voice information processing unit 414 includes a machine learning model that processes voice information, and executes processing of a learning stage or processing of an inference stage of the machine learning model. The machine learning model of the voice information processing unit 414 performs, for example, computation of a deep learning algorithm using a deep neural network (DNN) to recognize a place name, a landmark name such as a building, a store name, a target name, and the like included in the utterance information. The target may include a pedestrian, a signboard, a sign, equipment installed outdoors such as a vending machine, building components such as a window and an entrance, a road, a vehicle, a two-wheeled vehicle, and the like included in the utterance information. The DNN becomes a learned state by performing the processing of the learning stage, and can perform recognition processing (processing of the inference stage) for new utterance information by inputting the new utterance information to the learned DNN. Note that, in the present embodiment, a case where the server 110 executes voice recognition processing will be described as an example, but the voice recognition processing may be executed in the vehicle or the communication device, and a recognition result may be transmitted to the server 110.

An image information processing unit 415 includes a machine learning model that processes image information, and executes processing of a learning stage or processing of an inference stage of the machine learning model. The machine learning model of the image information processing unit 415 performs processing of recognizing a target included in image information by performing computation of a deep learning algorithm using a deep neural network (DNN), for example. The target may include a pedestrian, a signboard, a sign, equipment installed outdoors such as a vending machine, building components such as a window and an entrance, a road, a vehicle, a two-wheeled vehicle, and the like included in the image.

A meeting position presumption unit 416 executes meeting position adjustment processing described later. The meeting position adjustment processing will be described later. A user presumption unit 417 executes user presumption processing described later. Here, the user presumption is to presume a user who requests to meet with the vehicle 100, and the user is presumed by specifying a position of the requesting user from one or more persons in a predetermined region. Detailed processing will be described later.

Note that the server 110 can generally use more abundant calculation resources than the vehicle 100 and the like. Further, by receiving and accumulating image data captured by various vehicles, learning data in a wide variety of situations can be collected, and learning corresponding to more situations becomes possible.

A communication unit 401 is, for example, a communication device including a communication circuit and the like, and communicates with an external device such as the vehicle 100 or the communication device 120. The communication unit 401 receives at least one of image information and position information from the vehicle 100, and utterance information and position information from the communication device 120, and transmits a control command to the vehicle 100 and utterance information to the communication device 120. A power supply unit 402 supplies electric power to each unit in the server 110. A storage unit 403 is a nonvolatile memory such as a hard disk or a semiconductor memory.

(Configuration of Communication Device)

Next, a configuration of the communication device 120 will be described. The communication device 120 indicates a portable device such as a smartphone possessed by the user 130. Here, a configuration necessary for carrying out the present invention will be mainly described. Therefore, other configurations may be further included in addition to the configuration described below. The communication device 120 includes a control unit 501, a storage unit 502, an external communication device 503, a display operation unit 504, a microphone 507, a speaker 508, and a speed sensor 509. The external communication device 503 includes a GPS 505 and a communication unit 506.

The control unit 501 includes a processor represented by a CPU. The storage unit 502 stores programs executed by the processor, data used for processing by the processor, and the like. Note that the storage unit 502 may be incorporated in the control unit 501. The control unit 501 is connected to the other components 502, 503, 504, 508, and 509 by a signal line such as a bus, can transmit and receive signals, and controls the entire communication device 120.

The control unit 501 can communicate with the communication unit 401 of the server 110 via the network 140 using the communication unit 506 of the external communication device 503. Further, the control unit 501 acquires various types of information via the GPS 505. The GPS 505 acquires a current position of the communication device 120. As a result, for example, the position information can be provided to the server 110 together with the utterance information of the user. Note that the GPS 505 is not an essential component in the present invention, and the present invention provides a system that can be used even in an indoor facility or the like, for which position information of the GPS 505 cannot be acquired. Therefore, the position information by the GPS 505 is treated as supplementary information for presuming the user.

The display operation unit 504 is, for example, a touch panel type liquid crystal display, and can perform various displays and receive a user operation. An inquiry content from the server 110 and information such as a meeting position with the vehicle 100 are displayed on the display operation unit 504. Note that, in a case where there is an inquiry from the server 110, it is possible to cause the microphone 507 of the communication device 120 to acquire the user's utterance by operating a microphone button displayed in a selectable manner. The microphone 507 acquires the utterance by the user as voice information. For example, the microphone may transition to a starting state by pressing the microphone button displayed on an operation screen to acquire the user's utterance. The speaker 508 outputs a voice message at the time of making an inquiry to the user according to an instruction from the server 110 (for example, "What color of clothes are you wearing?" or the like). In a case of an inquiry by voice, for example, even in a simple configuration such as a headset in which the communication device 120 does not have a display screen, it is possible to communicate with the user. Further, even in a case where the user does not hold the communication device 120 in hand or the like, the user can listen to an inquiry of the server 110 from an earphone or the like, for example.

The speed sensor 509 is an acceleration sensor that detects acceleration in a front-and-rear direction, a lateral direction, and a vertical direction of the communication device 120. An output value indicating the acceleration output from the speed sensor 509 is stored in a ring buffer of the storage unit 502, and is overwritten from the oldest record. The server 110 may acquire these pieces of data and use the data to detect a movement direction of the user.

<Outline of Meeting Position Presumption Using Utterance and Images>

Figure 5:
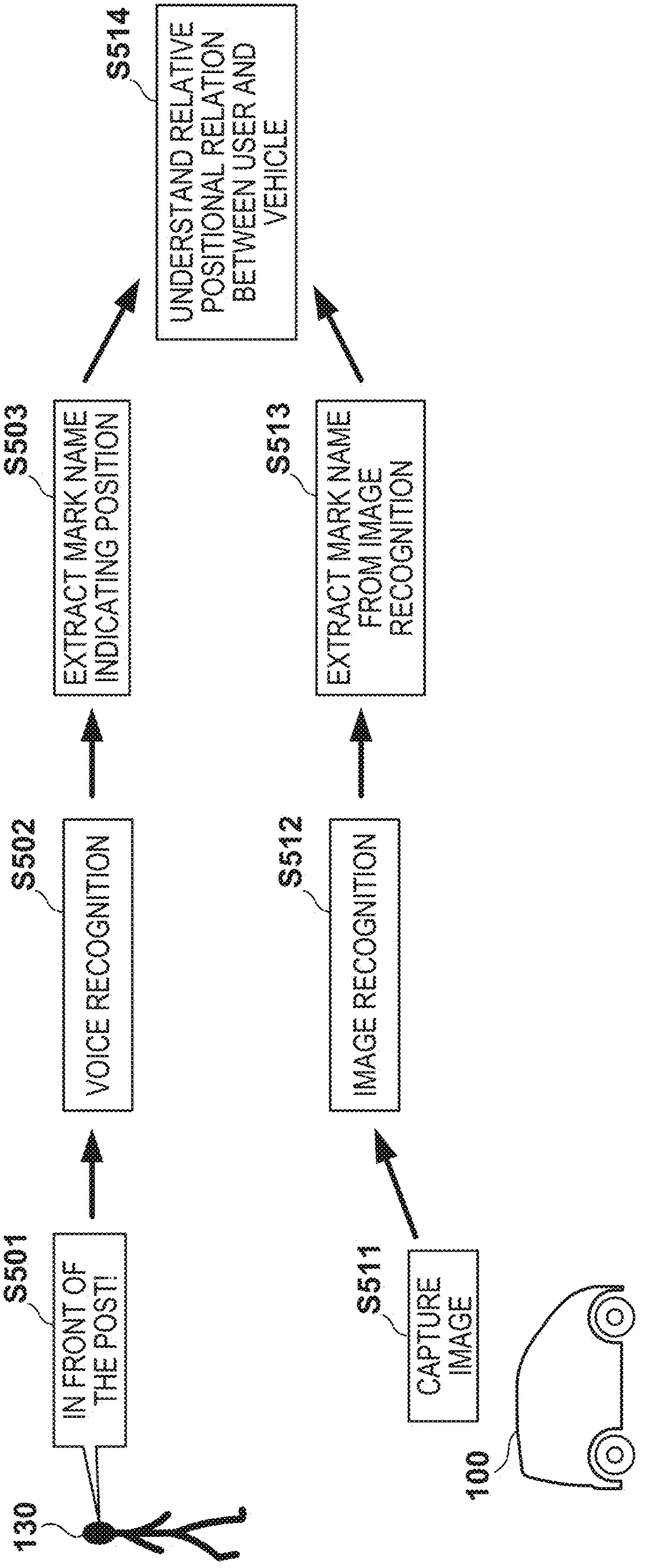
FIG. 5 is a diagram illustrating presumption of a meeting position using an utterance and an image according to the present embodiment.

An outline of meeting position presumption using utterance and images executed in the server 110 will be described with reference to FIG. 5. As described above, the present processing is processing executed after the user 130 and the vehicle 100 located at distant places come close to the extent that a target or the like (serving as a visual mark) can be visually confirmed. FIG. 5 illustrates a state where a relative positional relation between the user and the vehicle is understood using the utterance information of the user and the image information captured by the vehicle 100.

First, in S501, the user 130 makes an utterance (for example, "In front of the post!") indicating the meeting position, to the communication device 120. The communication device 120 acquires the utterance of the user by the microphone 507 and transmits acquired utterance information to the server 110. In S502, the server 110 performs voice recognition of the utterance information by the user, and in S503, the server 110 extracts information regarding the position of the user from the utterance information. Here, as the information regarding the position of the user, information indicating the name of the mark such as the building, which is the name indicating the physical object visually recognizable by the user, is extracted.

On the other hand, in S511, since the distance between the vehicle 100 and the user 130 is reduced to some extent, the surroundings of the vehicle 100 are imaged by the detection units 15 to 17 to be the imaging devices, and one or more pieces of imaged data are transmitted to the server 110 as image information. Note that, here, the imaged data transmitted to the server 110 is not limited to data imaged by the vehicle 100, and data imaged by a camera provided in another vehicle or a monitoring camera installed in the periphery may be transmitted. In S512, the server 110 performs image recognition (image analysis) on the received one or more pieces of imaged data, and in S513, the server 110 extracts the mark name extracted in S503 from the image recognition result. Here, the extraction of the mark names is taken as an example, but there is no intention to limit the present invention to such control, and for example, the object such as the building recognized based on the image recognition result may be used. Thereafter, in S514, the server 110 understands the positional relation between the user and the vehicle using the results of S503 and S513, presumes the user, and further presumes a target position to be the meeting position.

<Series of Operations of Meeting Position Adjustment Processing>

Figure 6:
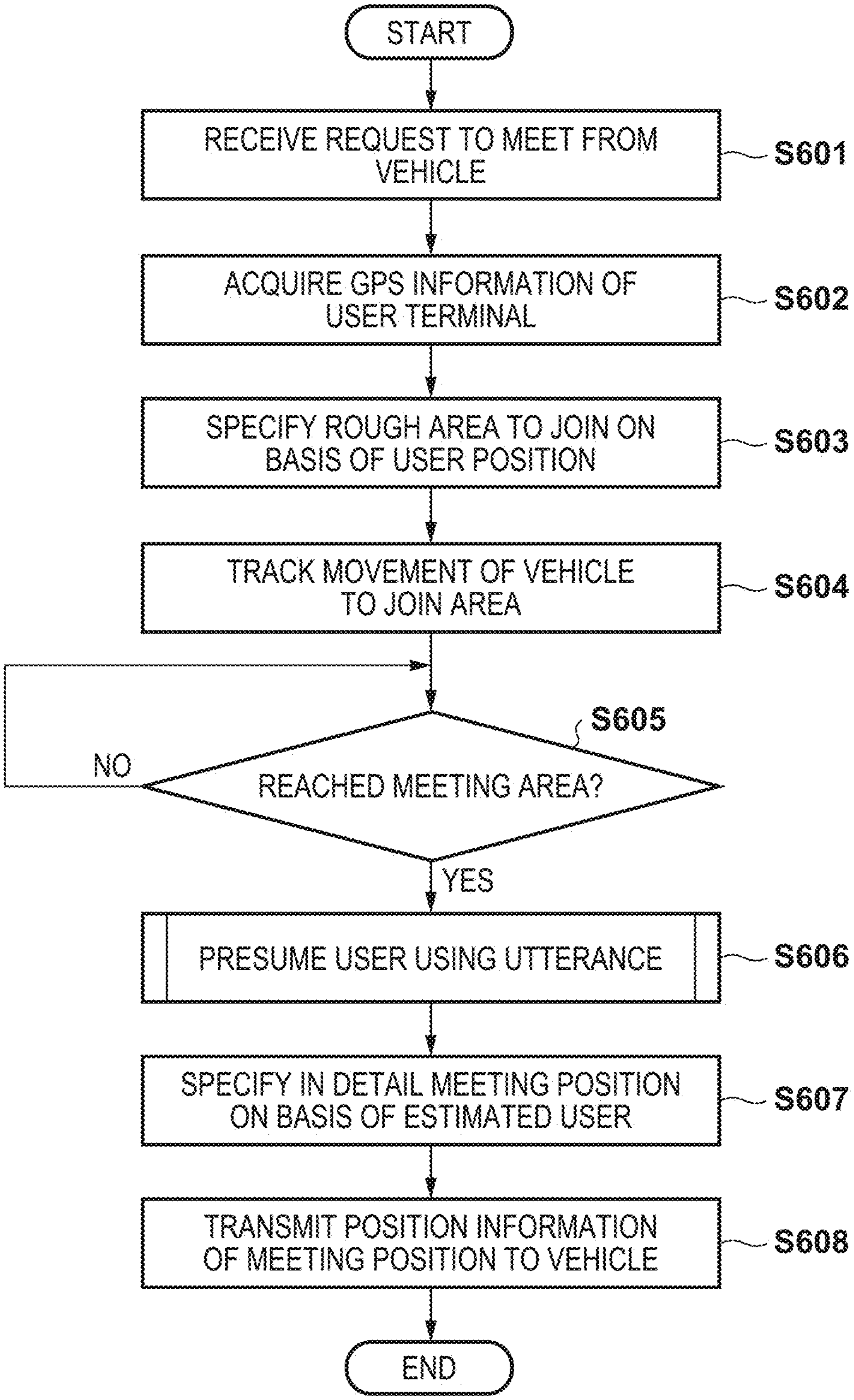
FIG. 6 is a flowchart illustrating a series of operations of meeting position adjustment processing according to the present embodiment.

Next, a series of operations of the meeting position adjustment processing in the server 110 according to the present embodiment will be described with reference to FIG. 6. Note that the present processing is realized by the control unit 404 executing a program. Note that, in the following description, it is assumed that the control unit 404 executes each process for the sake of simplicity of description, but corresponding processing is executed by each unit of the control unit 404 (described above with reference to FIG. 4). Note that, here, a flow in which the user and the vehicle finally meet will be described, but a characteristic configuration of the present invention is a configuration related to presumption of the user, and a configuration for presuming the meeting position is not essential. That is, in the following, a processing procedure including control related to presumption of the meeting position will be described, but control may be performed such that only a processing procedure related to presumption of the user is performed.

In S601, the control unit 404 receives a request (meet up request) to meeting with the vehicle 100 from the communication device 120. In S602, the control unit 404 acquires the position information of the user from the communication device 120. Note that the position information of the user is position information acquired by the GPS 505 of the communication device 120. In S603, the control unit 404 specifies a rough area (it is also simply referred to as a meeting area or a predetermined region) to meet based on the position of the user acquired in S602. The meeting area is, for example, an area where a radius centered on the current position of the user 130 (communication device 120) is a predetermined distance (for example, several hundred meters).

In S604, the control unit 404 tracks the movement of the vehicle 100 toward the meeting area based on the position information periodically transmitted from the vehicle 100, for example. Note that the control unit 404 can select a vehicle closest to the current position of the user 130 as the vehicle 100 to meet with the user 130 from a plurality of vehicles located around the current position (or the arrival point after a predetermined time). Alternatively, in a case where the information designating the specific vehicle 100 is included in the meeting request, the control unit 404 may select the specific vehicle 100 as the vehicle 100 meeting with the user 130.

In S605, the control unit 404 determines whether the vehicle 100 has reached the meeting area. For example, when the distance between the vehicle 100 and the communication device 120 is within the radius of the meeting area, the control unit 404 determines that the vehicle 100 has reached the meeting area, and advances the processing to S606. If not, the server 110 returns the processing to S605 and waits for the vehicle 100 reaching the meeting area.

In S606, the control unit 404 sets a probability distribution for presuming the user using the utterance, and presumes the user in the captured image. Details of the user presumption processing using the user's utterance here will be described later. Next, in S607, the control unit 404 further presumes the meeting position based on the user presumed in S606. For example, by presuming the user in the captured image, in a case where the user has uttered "nearby red post" or the like as the meeting position, it is possible to presume the meeting position more accurately by searching for the red post close to the presumed user. Thereafter, in S608, the control unit 404 transmits the position information of the meeting position to the vehicle. That is, the control unit 404 transmits the meeting position presumed in the processing of S607 to the vehicle 100 and moves the vehicle 100 to the meeting position. After transmitting the meeting position to the vehicle 100, the control unit 404 ends the series of operations.

<Setting of Probability Distribution>

Next, an example of presuming the user by setting a probability distribution that the user exists in a predetermined region from at least one of the utterance information and the position information of the user will be described with reference to FIGS. 7A and 7B. Here, the presumption of the user basically indicates that which of persons detected in a captured image obtained by imaging the periphery of the predetermined region is the user is presumed.

Figure 7A:
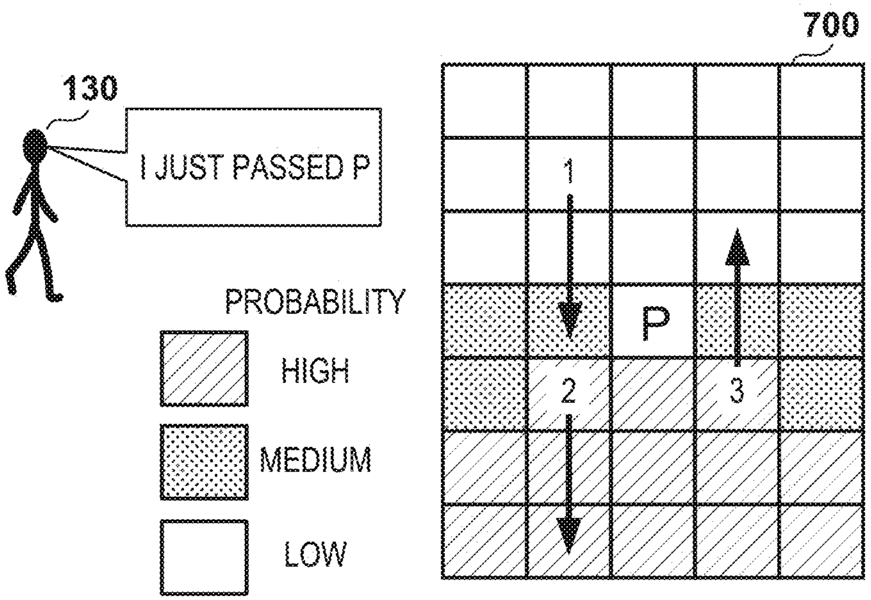
FIGS. 7A and 7B are diagrams illustrating presumption of a user by a probability distribution according to the present embodiment.

FIG. 7A illustrates a probability distribution in a case where the user has uttered "I just passed P". "P" indicates a mark such as a specific commercial facility, and the server 110 searches for "P" extracted from the utterance information on the map, based on rough position information of the user. The rough position information of the user is specified from a specific area extracted from the utterance information, position information acquired from the GPS 505 of the communication device 120 possessed by the user, and the like.

When the rough position information of the user is specified from the utterance information, for example, in a case where the user has made an utterance related to another mark before uttering "I just passed P", "P" may be specified based on the two utterances. For example, in a case where the user has uttered "I'm in front of Q now" before uttering "I just passed P", "P" in which "Q" is present within a predetermined range is searched for on the map. Similarly to "P", "Q" indicates a mark such as a specific commercial facility. In this way, even when the position information acquired from the GPS 505 cannot be used, the mark P can be specified. When "P" is searched for on the map, the server 110 divides a predetermined region 700 centered on "P" into a plurality of regions, and sets a probability distribution indicating a probability that the user is present in each of the regions.

Here, the probability that the user is present is set to each divided region, and a plurality of patterns is prepared in advance according to the utterance information by the user. Basically, the movement direction of the user with respect to the mark P is determined to set the probability. Here, the movement direction of the user is a concept including various movement directions, and includes, for example, a movement direction indicating an azimuth (north, south, east, and west) on the map and a movement direction with respect to a mark such as whether the user approaches or moves away from the mark P, and is presumed by information obtained from at least one of the utterance information and the position information of the user. For example, in FIG. 7A, the user 130 utters "I passed the mark P", and it can be determined that the user moves away from the mark P. Therefore, as illustrated in FIG. 7A, the server 110 sets a probability of a region where the person moves away from the mark P to be relatively high (probability "high"), sets a peripheral region to be next high (probability "medium"), and sets the other regions to be relatively low (probability "low"). Note that, when the region having the probability "high" is determined, the movement direction of the user is presumed from at least one of the rough position information and the utterance information of the user with respect to the mark P, and it is possible to determine which region is set to have a high probability with respect to the mark P according to the presumed movement direction. In the example of FIG. 7A, since the movement direction of the user can be presumed to be a direction from the north side toward the south side, a probability of a region corresponding to the south side of the mark Pis set high.

The movement direction of the user is presumed based on at least one of the utterance information and the position information acquired from the GPS 505. In a case where the movement direction of the user is presumed from the utterance information, the presumption may be performed based on the utterance information before uttering "I passed the mark P". For example, in a case where the user has made an utterance indicating that the user has been in the vicinity of the mark Q on the north side of the mark P before uttering "I passed the mark P", it can be presumed that the movement direction of the user is a direction from the north side toward the south side.

Thereafter, the server 110 performs image recognition on the captured image captured by the detection units 15 to 17 of the vehicle 100, and detects one or more persons existing in the predetermined region. Here, not only the image captured by the vehicle 100 but also image data captured by other imaging devices can be used. The server 110 determines the movement direction of each of the detected persons by image analysis, and sets a high probability to the user who performs an operation matched with the movement direction of the user acquired from at least one of the utterance information by the user and the position information. In FIG. 7A, the detected persons are indicated by "1", "2", and "3", and movement directions of these persons are indicated by arrows. Therefore, since the user utters "I passed the mark P", the highest probability is set to "2" having passed P, the next high probability is set to "3" passing P, and the lowest probability is set to "1" approaching the mark "P". Therefore, the probability is set to each of the detected persons in a relation of "2">"3">"1". Furthermore, the server 110 acquires a combined probability obtained by combining the probability given to the person and the probability set to the region where the person is located, and presumes the person with the highest probability as the user. In the example of FIG. 7A, the person of "2" is presumed as the user.

Figure 7B:
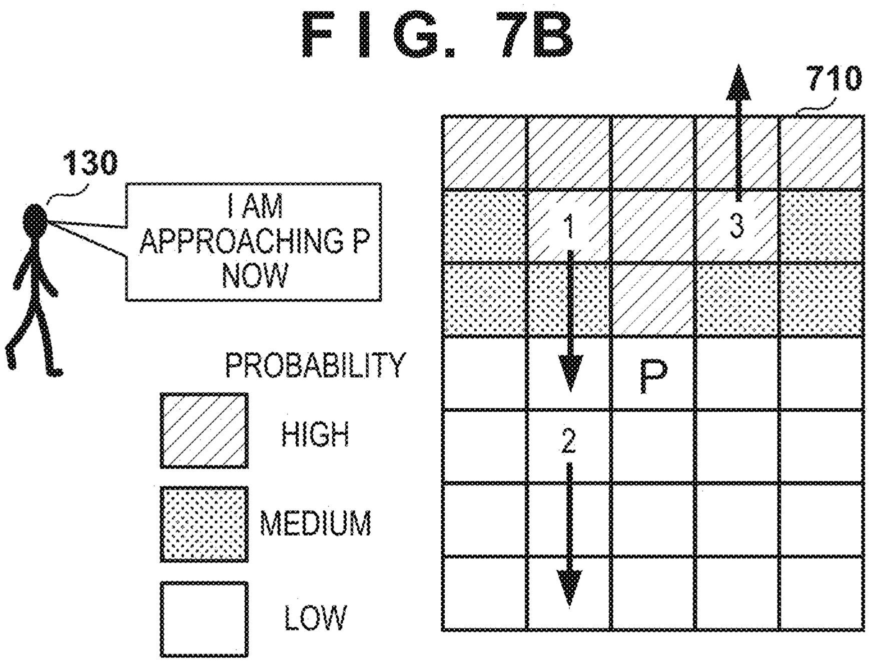

FIG. 7B illustrates a probability distribution in a case where the user has uttered "I am approaching P now". The server 110 searches for "P" on the map, similarly to the case described with reference to FIG. 7A. When "P" is searched for on the map, the server 110 divides a predetermined region 710 centered on "P" into a plurality of regions, and sets a probability distribution indicating a probability that the user is present in each of the regions.

In FIG. 7B, the user 130 utters "I am approaching the mark P", and it can be determined that the user is approaching the mark P. Therefore, as illustrated in FIG. 7B, the server 110 sets a probability of a region where the person is approaching the mark P to be relatively high (probability "high"), sets a peripheral region to be next high (probability "medium"), and sets the other regions to be relatively low (probability "low"). Note that, when the region having the probability "high" is determined, it is possible to determine which region is set to have a high probability with respect to the mark P from the rough position information of the user with respect to the mark P. In the example of FIG. 7B, since the preceding position of the user can be roughly recognized as the north side of the mark P, the probability of the corresponding region is set high.

Thereafter, the server 110 performs image recognition on the captured image captured by the detection units 15 to 17 of the vehicle 100, and detects one or more persons existing in the predetermined region. Here, not only the image captured by the vehicle 100 but also image data captured by other imaging devices can be used. The server 110 determines the movement direction of each of the detected persons by image analysis, and sets a high probability to the user who performs an operation matched with the movement direction of the user acquired from at least one of the utterance information by the user and the position information. In FIG. 7B, the detected persons are indicated by “1”, “2”, and “3”, and movement directions of these persons are indicated by arrows. Therefore, since the user utters “I am approaching the mark P”, the probability of “1” approaching “P” is set to be highest, and the probabilities of “2” and “3” moving away from the mark “P” are set low. Therefore, the probability is set to each of the detected persons in a relation of “1”>“2”=“3”. Furthermore, the server 110 acquires a combined probability obtained by combining the probability given to the person and the probability set to the region where the person is located, and presumes the person with the highest probability as the user. In the example of FIG. 7B, the person of “1” is presumed as the user.

<Series of Operations of User Presumption Processing Using Utterance>

Next, a series of operations of user presumption processing (S606) using the utterance in the server 110 will be described with reference to FIG. 8. Note that the present processing is realized by the control unit 404 executing a program, similarly to the processing illustrated in FIG. 6.

In S801, the control unit 404 transmits voice information asking about “the place related to the visual mark” to the communication device 120. The voice information asking about the place related to the visual mark includes a voice such as “Is there a store nearby?”. The voice information asking about the place related to the visual mark may be information that is determined in advance and is stored in the storage unit 403.

In S802, the control unit 404 receives the utterance information of the user from the communication device 120, recognizes the utterance content, and specifies a predetermined region centered on the mark included in the utterance content. At this time, the utterance information of the user includes information on the place related to the visual mark, such as “There is a xx coffee shop building”. Next, in S803, as described above using FIGS. 7A and 7B, the control unit 404 acquires the movement direction of the user according to the utterance information and the rough position of the user, and divides the specified predetermined region to set the probability distribution.

Next, in S804, the control unit 404 acquires an image obtained by imaging the predetermined region specified in S802 from the vehicle 100 or the like and analyzes the image. Specifically, the control unit 404 analyzes the acquired captured image and detects one or more persons (candidate users) located in the predetermined region. Further, the control unit 404 presumes a movement direction (movement direction of one or more persons) from the direction and the attitude of each detected person. Note that the control unit 404 can also acquire time-series image data, and may specify the movement direction by a temporal position difference. Next, in S805, the control unit 404 gives a probability that each detected person is the user who requests to meet with the vehicle to each detected person from the movement direction of the candidate user. In the processing here, as described using FIGS. 7A and 7B, the control unit 404 gives the probability according to the utterance information by the user.

In S806, the control unit 404 presumes the user using the utterance information, the position information, and the image information, and ends the present processing. Detailed processing will be described later using FIG. 9. Note that, if a probability distribution that allows the user to be specified in the processing up to S805 is already set, a person having the highest probability or a probability of a predetermined value or more is specified as the user in S806. On the other hand, in a case where one user cannot be specified, as described using FIG. 9, a conversation with the user is further performed to narrow down the candidate users.

Figure 9:
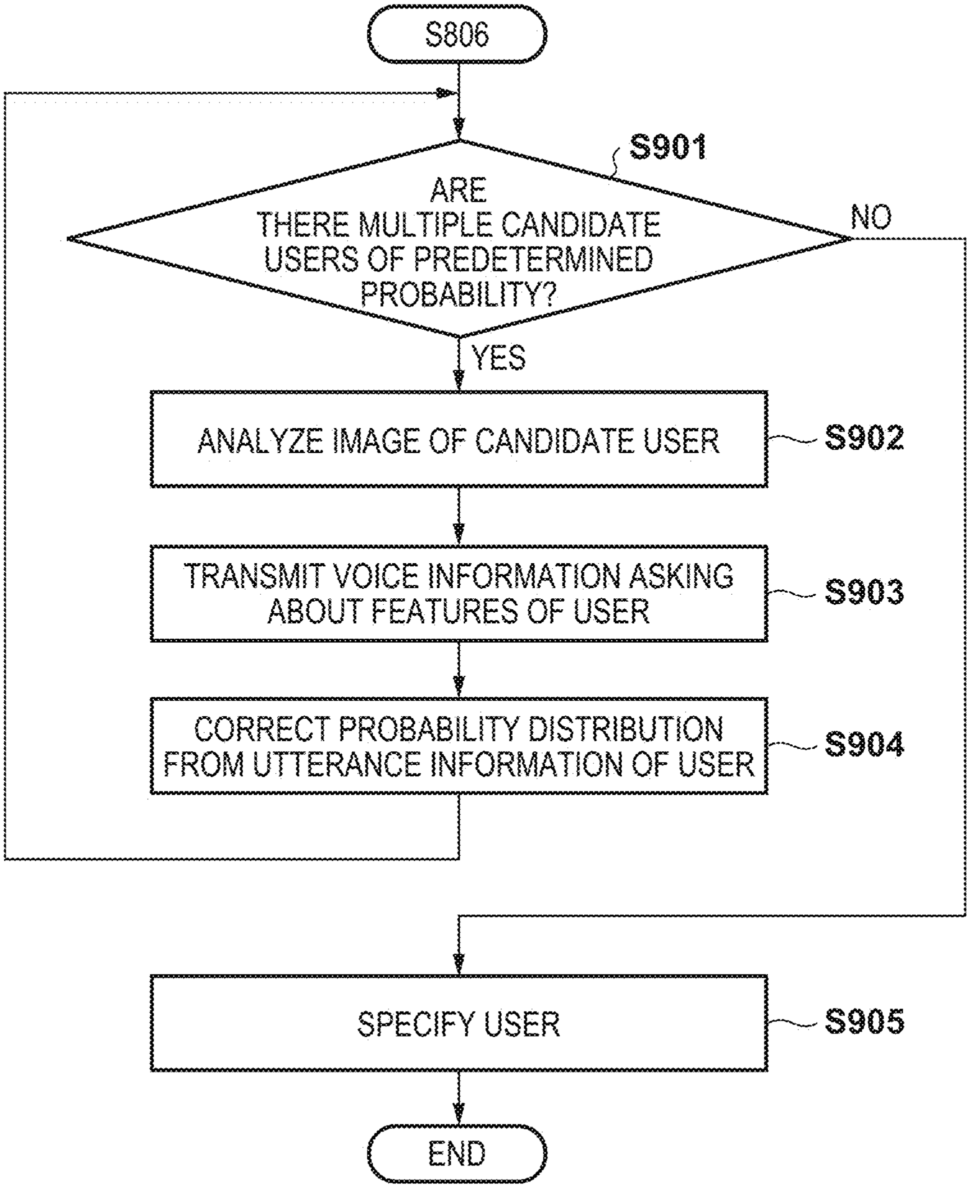
FIG. 9 is a flowchart illustrating a series of operations of user presumption processing using an utterance and an image according to the present embodiment.

Detailed processing of S806 will be described with reference to FIG. 9. Note that the present processing is realized by the control unit 404 executing a program, similarly to the processing illustrated in FIG. 6.

Figure 8:
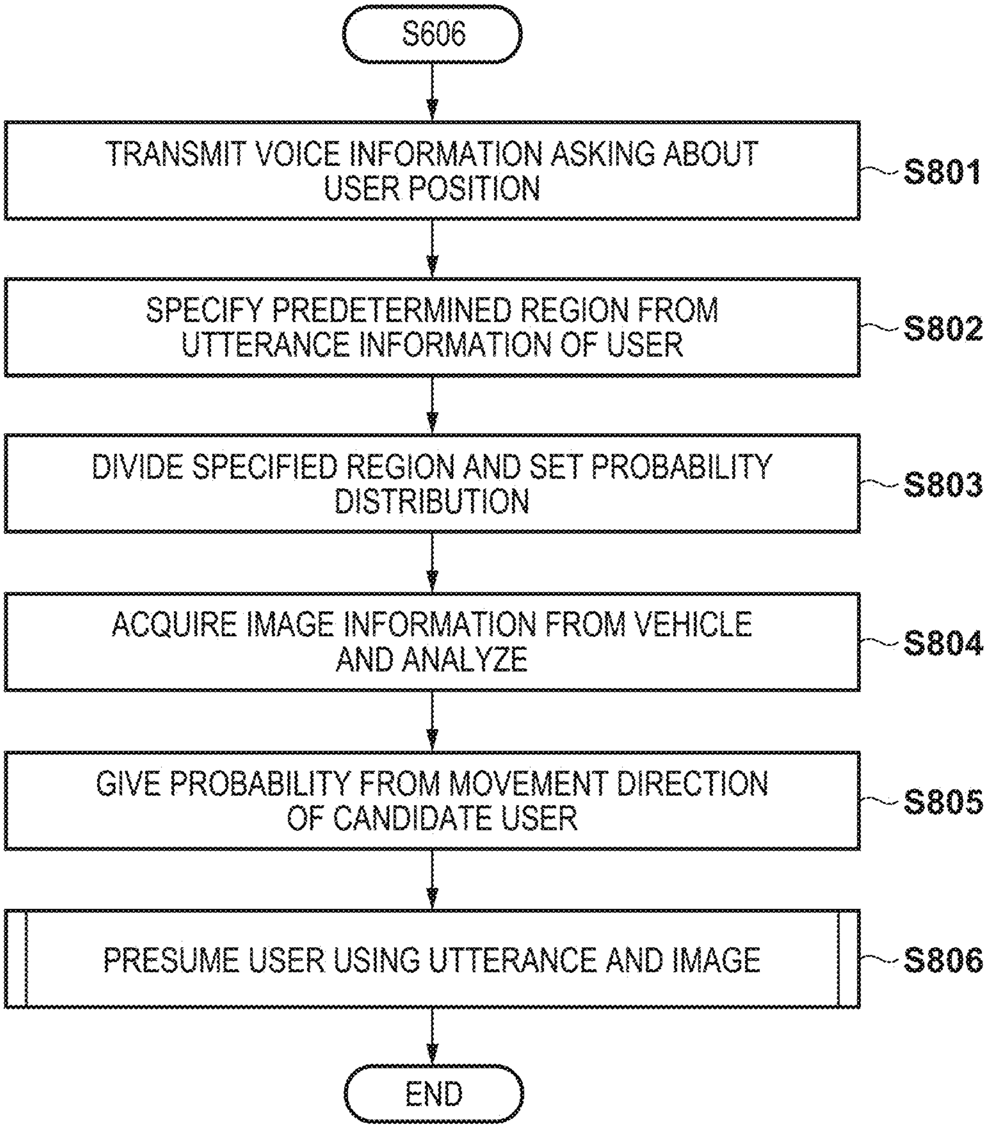
FIG. 8 is a flowchart illustrating a series of operations of user presumption processing by a probability distribution according to the present embodiment.

In S901, the control unit 404 calculates combined probabilities obtained by combining the probabilities given to the respective divided regions in the predetermined region set in the flowchart of FIG. 8 and one or more detected persons, and determines whether or not there is a plurality of candidate users having a high combined probability. For example, in a method of calculating the combined probability, the combined probability is calculated by combining the probability given to the candidate user and the probability set to the divided region corresponding to the position of the candidate user. If there is the plurality of candidate users, the processing proceeds to S902, and if not, the processing proceeds to S905. In S905, the control unit 404 specifies the candidate user having the highest combined probability as the user, and ends the processing.

On the other hand, since the user cannot be specified when there is the plurality of candidate users, in S902, the control unit 404 further analyzes the image captured by imaging the predetermined region, and further extracts features of each detected person. The features here are features of clothes, a hat, glasses, or the like worn by the user, or features of things such as a bag possessed by the user, and indicate, for example, a color, a shape, a number, or the like thereof.

Next, in S903, the control unit 404 transmits additional voice information (for example, “What color of clothes are you wearing?”) asking about the features of the user to the communication device 120, according to the features extracted in S902. Here, in the voice information to be transmitted, for example, in a case where there is the plurality of candidate users, it is desirable to ask about matters relating to the different features of each candidate user. As a result, it is possible to more efficiently specify the user. For example, in a case where the colors of clothes worn by the candidate users are different from each other, it is desirable to ask the user by voice information such as “What color of clothes are you wearing?”.

Thereafter, in S904, the control unit 404 receives the utterance information by the user from the communication device 120 and corrects the probability distribution. Note that, here, the position information of the communication device 120 may be received together and used to correct the probability distribution. Here, the control unit can select at least one of the probabilities given to the person and the probability set to the divided region as the probability to be corrected in the content of the utterance information. If the probability distribution is corrected, the control unit 404 returns the processing to S901, and determines again whether or not there is still the plurality of candidate users. The control unit 404 repeatedly executes the processing of S902 to S904 until the candidate user is narrowed down to one person.

<Display Example in Communication Device>

Figure 10:
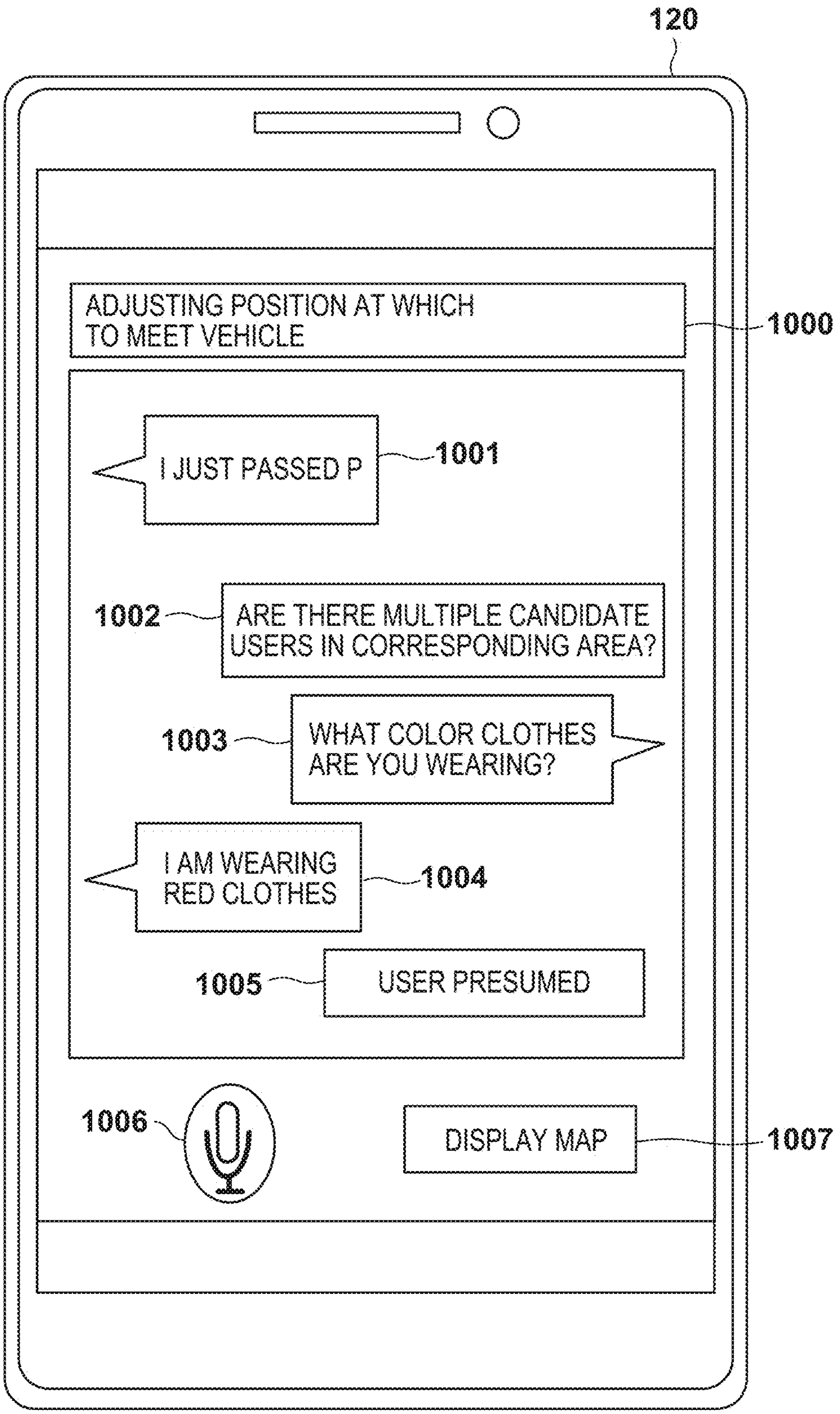
FIG. 10 is a diagram illustrating presumption of a user using an utterance and an image according to the present embodiment.

FIG. 10 illustrates an example of a display unit of the communication device 120 illustrating a process of presuming a user using an utterance and an image. A display screen 1000 illustrated in FIG. 10 is displayed on the display operation unit 504 of the communication device 120 according to the screen information provided from the server 110, and illustrates a state in which the user is presumed during the adjustment of the meeting position of the vehicle and the user. Therefore, the display operation unit 504 of the communication device 120 may function as a web browser for the server 110 that is a web server.

A display 1001 illustrates a state in which the communication device 120 acquires the utterance of the user and displays the acquired content in a character string. For example, the user can provide an utterance to the communication device 120 by uttering to the communication device 120 while pressing a microphone button 1006. Since language analysis is required for the character string to be displayed, it is desirable to receive an analysis result of the utterance information from the server 110 and display the analysis result instead of performing the language analysis by the communication device 120. As a result, the processing load on the communication device 120 can be reduced, and it is not necessary to mount a language analysis module on the communication device 120. A display 1002 is displayed in a case where there is the plurality of candidate users in S901 of FIG. 9 as a result of the setting of the probability distribution for the predetermined region described in FIG. 8, and includes a message indicating that there is the plurality of candidate users in the corresponding area where the user will exist.

A display 1003 indicates an inquiry from the server 110 to the user, and displays the voice information transmitted from the server 110 to the communication device 120 as a message (for example, "What color of clothes are you wearing?"). At this time, the communication device 120 may output a voice according to the message via the speaker 508. Thereafter, the user utters an answer to the inquiry to the microphone 507 of the communication device 120 while pressing the microphone button 1006. A display 1004 indicates the answer of the user, and displays the utterance information analyzed by the server 110 as a message. In the display 1004, an utterance of the user (for example, "I am wearing red clothes") analyzed by the server 110 is displayed. Thereafter, when the server 110 narrows down the candidate users to one person and specifies the user, a message ("User presumed") of a display 1005 is displayed.

Further, a map display button 1007 may be operably displayed on the display screen 1000. When the map display button 1007 is operated, the screen transitions to a map display screen 1100 to be described later. The map display button 1007 may be operably displayed at the stage where the user has been presumed.

Figure 11:
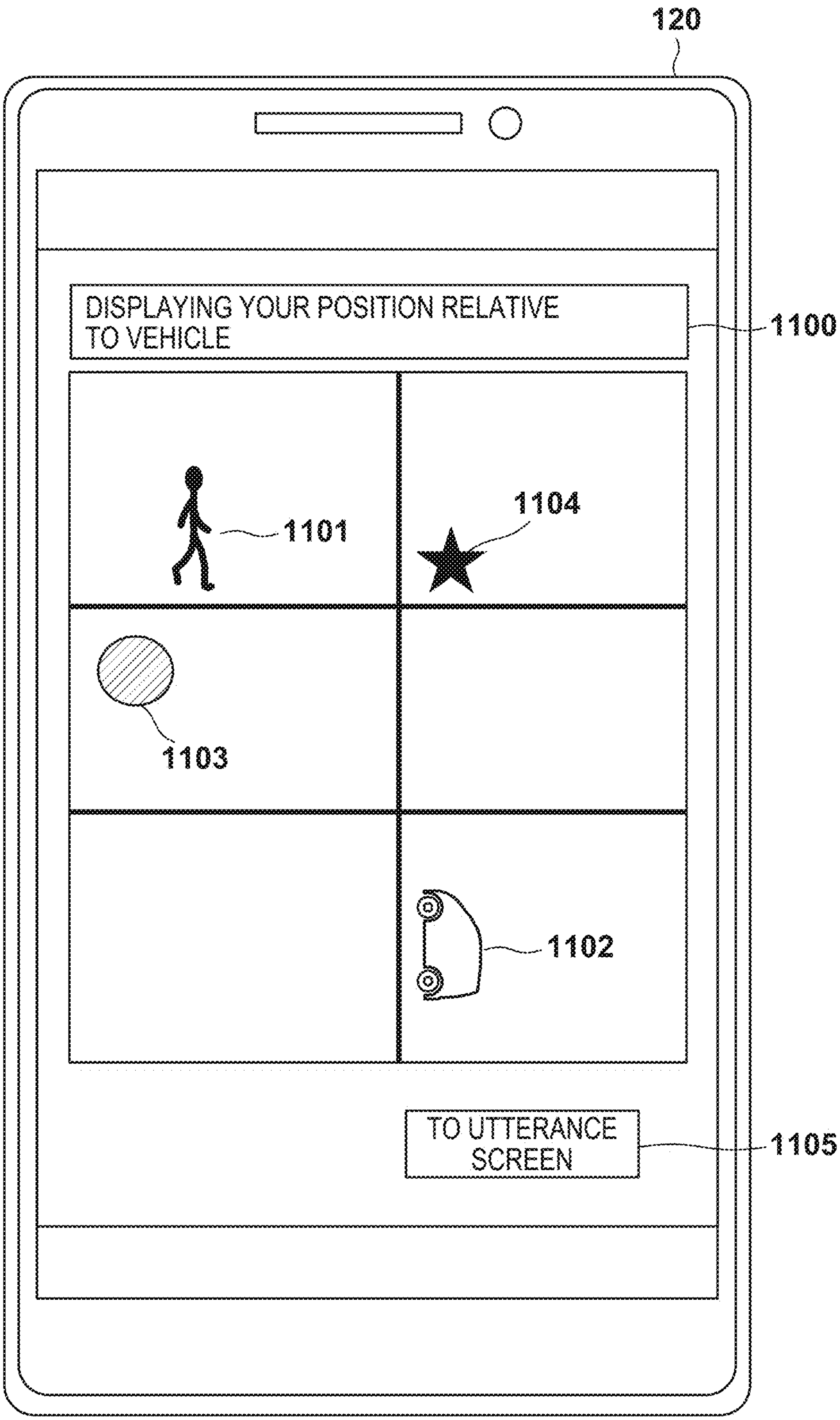
FIG. 11 is a diagram illustrating an example of a screen displaying a positional relation between a presumed user and a mobile object according to the present embodiment.

FIG. 11 illustrates a map display screen 1100 that displays a positional relation between the presumed user and the vehicle. The map display screen 1100 is displayed on the display operation unit 504 of the communication device 120, and a map of the surroundings of the predetermined region is displayed.

A display 1101 on the map indicates the user presumed in S606. A display 1002 indicates the vehicle 100 meeting the user 130. A display 1103 indicates the position of the mark specified from the utterance information by the user in S802. A display 1004 indicates the meeting position presumed from the utterance information of the user in S607. As described above, on the map display screen 1100, the presumed user, the mark, the meeting position, and the like are displayed on the map of the predetermined region to indicate their positional relation. Note that the user can confirm the positional relation and readjust the meeting position. A button 1105 is a button for transitioning to an utterance screen, and when the button 1105 is operated, the screen transitions to the display screen 1000. The user can operate the button 1105 to return to the display screen 1000 and request that the server 110 readjust the meeting position by utterance.

Note that, although an example of the map display screen displayed at the stage where the user has been presumed will be described here, there is no intention to limit the present invention. For example, map display may be performed at the stage where the plurality of candidate users has been displayed, the plurality of candidate users may be displayed on a map indicating a predetermined region in a selectable manner, and the user may be caused to select a candidate user indicating the user. Alternatively, a display screen on which a plurality of candidate users detected on a captured image can be selected on the captured image may be provided. In this case, for example, the detected person may be surrounded by a line or the like, and the user may select the inside thereof to select the user. As described above, by causing the user to select himself/herself, it is possible to specify the user more efficiently and accurately. Further, the presumed meeting position may not be displayed, and the meeting position may not be presumed in the first place. In this case, for example, the vehicle 100 may be controlled to approach the presumed user, or the user may be requested to designate the meeting position again. Furthermore, the vehicle 100 may suggest the meeting position to the user.

<Modifications>

Figure 12:
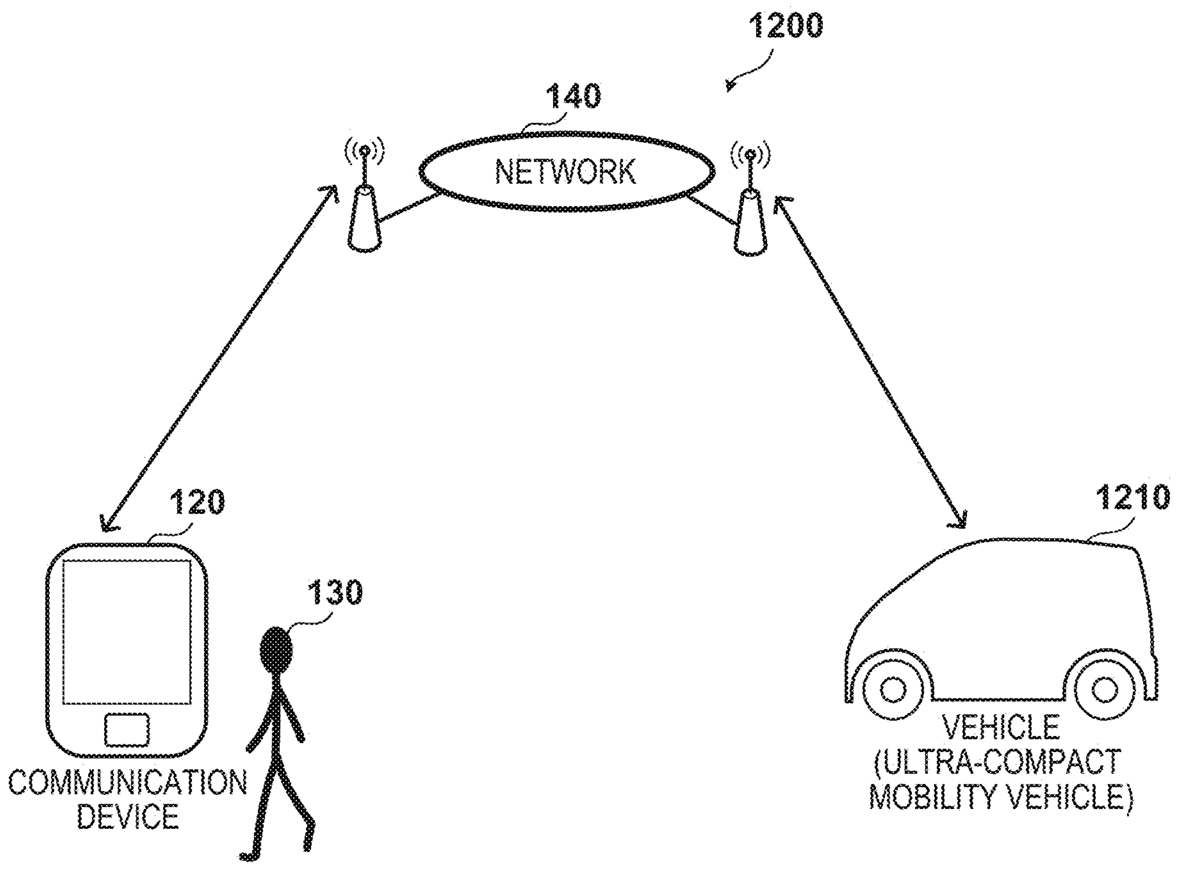
FIG. 12 is a diagram illustrating an example of an information processing system according to another embodiment.

Hereinafter, modifications according to the present invention will be described. In the above embodiment, the example in which the meeting position adjustment processing is executed in the server 110 has been described. However, the meeting position adjustment processing can also be executed on the vehicle side. In this case, as illustrated in FIG. 12, an information processing system 1200 includes a vehicle 1210 and a communication device 120. The utterance information of the user is transmitted from the communication device 120 to the vehicle 1210. Image information captured by the vehicle 1210 is processed by a control unit in the vehicle instead of being transmitted via a network. A configuration of the vehicle 1210 may be the same as that of the vehicle 100 except that the control unit 30 can execute the meeting position adjustment processing. The control unit 30 of the vehicle 1210 operates as a control device in the vehicle 1210, and executes the meeting position adjustment processing by executing the stored program. Communication between the server and the vehicle in the series of operations illustrated in FIGS. 6, 8, and 9 may be performed inside the vehicle (for example, inside the control unit 30 or between the control unit 30 and the detection unit 15). The other processing can be executed similarly to the server.

As described above, in the control device of the vehicle that adjusts the meeting position where the user and the vehicle will meet, at least one of the position information and the utterance information regarding the meeting position including the visual mark is acquired from the communication device. In addition, the visual mark included in the utterance information is specified, the movement direction of the user is acquired from at least one of the utterance information and the position information, and the user in the captured image is presumed based on the acquired movement direction of the user. Furthermore, the meeting position is presumed based on the presumed user.

Summary of Embodiments

1. An information processing apparatus (e.g. 110) in the above embodiment comprises:

a first acquisition unit (401, 413) configured to acquire, from a communication device of a user, at least one of utterance information by the user and position information of the communication device;

a specification unit (417) configured to specify a predetermined region according to a mark included in the utterance information;

a setting unit (417, S801-S805) configured to acquire a movement direction of the user from at least one of the utterance information and the position information acquired from the communication device of the user, and set a probability distribution that the user exists to the predetermined region based on the acquired movement direction of the user; and a presumption unit (417, S806) configured to presume the user based on the set probability distribution.

According to the embodiment, it is possible to suitably presume the user.

2. The information processing in the above embodiment, further comprises:

a second acquisition unit (401) configured to acquire a captured image captured around the specified predetermined region, wherein the setting unit detects one or more persons in the captured image acquired by the second acquisition unit (S804).

According to the embodiment, the user can be specified from the persons detected in the captured image around the predetermined region specified based on the utterance information of the user, and the user can be presumed more accurately.

3. The information processing apparatus in the above embodiment, wherein the presumption unit analyzes movement directions of the one or more persons with respect to the mark from the captured image, and presumes the user based on the probability distribution set by the setting unit and the analyzed movement directions of the one or more persons (S805).

According to the embodiment, when the user is presumed, the user can be more accurately specified by analyzing the movement direction of each detected person.

4. The information processing apparatus in the above embodiment, wherein the presumption unit gives a higher probability to a person in a movement direction matched with the movement direction of the user among the analyzed movement directions of the one or more persons than a person in a movement direction not matched with the movement direction of the user (S805).

According to the embodiment, when the user is presumed, the movement direction of each detected person is analyzed and combined with the utterance information by the user, so that the user can be more accurately specified.

5. The information processing apparatus in the above embodiment, wherein the presumption unit presumes the user based on a combined probability of the probability distribution set by the setting unit and a probability given to the one or more persons (S901, S905). Also, the presumption unit presumes a person with the corresponding combined probability is the highest as the user or a predetermined value or more as the user.

According to the embodiment, when the user is presumed, the movement direction of each detected person is analyzed and combined with the utterance information by the user, so that the user can be more accurately specified.

6. The information processing apparatus in the above embodiment, wherein, in a case where specifying one user is disabled, the presumption unit further acquires utterance information by the user by the first acquisition unit, updates the combined probability from the acquired utterance information and the captured image, and presumes the user (S902-S904).

According to the embodiment, by making an additional inquiry to the user, the candidate users can be narrowed down, and the user can be specified more accurately.

7. The information processing apparatus in the above embodiment, wherein the first acquisition unit makes an inquiry to the user based on analysis of a captured image captured by a mobile object located around the user, and acquires utterance information by the user as a response to the inquiry from the communication device (S902, S903).

According to the embodiment, by making an additional inquiry to the user based on the image analysis, the candidate users can be narrowed down, and the user can be specified more accurately.

8. The information processing apparatus in the above embodiment, wherein the second acquisition unit acquires at least one of a captured image captured by a mobile object located around the user and a captured image captured by an imaging unit located around the mobile object.

According to the embodiment, it is possible to use captured images of not only the imaging unit provided in the mobile object but also an imaging unit of another mobile object or a surrounding monitoring camera, and it is possible to presume the user more accurately and the meeting position.

9. The information processing apparatus according to clause 2, further comprising: a provision unit configured to provide screen information for displaying a result of language analysis of the utterance information acquired by the first acquisition unit to the communication device (FIG. 10).

According to the embodiment, it is possible to notify the user of how the system side recognizes the utterance information by the user, and it is possible to prevent presumption based on erroneous analysis.

10. The information processing apparatus according to clause 11, wherein the provision unit further provides screen information for selectively displaying a plurality of candidate users among one or more persons detected in the captured image acquired by the second acquisition unit to the communication device.

According to the embodiment, it is possible to suitably presume the user and adjust the meeting position between the user and the vehicle trying to meet each other.

11. In the information processing apparatus according to the above embodiment, the presumption unit further presumes the meeting position of the user and the vehicle according to the presumed user (S607).

According to the embodiment, the user can be caused to select himself/herself from a plurality of candidate users, and the user can be more accurately specified.

The invention is not limited to the foregoing embodiments, and various variations/changes are possible within the spirit of the invention.

What is claimed is:

1. An information processing apparatus comprising:
a storage device that stores instructions; and
at least one processor that executes the instructions to:
acquire, from a communication device of a user, first utterance information by the user;
specify a predetermined region according to a mark included in the first utterance information;
acquire a captured image captured around the specified predetermined region;
acquire a movement direction of the user from the first utterance information, and set a probability distribution indicating probabilities that the user exists to each of a plurality of regions, wherein the plurality of regions are areas that have been divided from the predetermined region;
analyze the captured image and extract one or more candidate users and each feature of the one or more candidate users;
generate a question inquiring a feature of the user based on the extracted one or more candidate users and each feature, and send the generated question,
acquire, from a communication device of the user, second utterance information for the question and by the user;
presume the user based on the set probability distribution, the extracted feature of the one or more candidate users and each feature, and the second utterance information, and
send, to a moving object, a meeting position determined based on the presumed user to cause the moving object to move the meeting position.

2. The information processing apparatus according to claim 1, wherein presuming the user includes correcting the probability distribution further based on position information of the communication device.

3. The information processing apparatus according to claim 1, wherein the captured image captured around the specified predetermined region includes at least one of a captured image captured by a mobile object located around the user and a captured image captured by an imaging device located around the mobile object.

4. A method of controlling an information processing apparatus, the method comprising:
acquiring, from a communication device of a user, first utterance information by the user;
specifying a predetermined region according to a mark included in the first utterance information;
acquiring a captured image captured around the specified predetermined region;
acquiring a movement direction of the user from the first utterance information, and set a probability distribution indicating probabilities that the user exists to each of a plurality of regions, wherein the plurality of regions are areas that have been divided from the predetermined region;
acquiring, from a communication device of the user, second utterance information by the user;
analyzing the captured image and extract one or more candidate users and each feature of the one or more candidate users;
generating a question inquiring a feature of the user based on the extracted one or more candidate users and each feature, and send the generated question,
acquiring, from a communication device of the user, second utterance information for the question and by the user;
presuming the user based on the set probability distribution, the extracted feature of the one or more candidate users and each feature, and the second utterance information, and
sending, to a moving object, a meeting position determined based on the presumed user to cause the moving object to move the meeting position.

5. A mobile object comprising:
a communication device that communicates with a communication device of a user;
a camera that images a surrounding portion of the mobile object;
a storage device that stores instructions; and
at least one processor that executes the instructions to:
acquire, from the communication device of the user and by the communication device, first utterance information by the user;
specify a predetermined region according to a mark included in the first utterance information;
acquire a captured image captured around the specified predetermined region;
acquire a movement direction of the user from the first utterance information, and set a probability distribution indicating probabilities that the user exists to each of a plurality of regions, wherein the plurality of regions are areas that have been divided from the predetermined region;
analyze the captured image and extract one or more candidate users and each feature of the one or more candidate users; and
generate a question inquiring a feature of the user based on the extracted one or more candidate users and each feature, and send the generated question,
acquire, from a communication device of the user and by the communication device, second utterance information for the question and by the user;
presume the user based on the set probability distribution, the extracted feature of one or more persons, and the second utterance information, and
control the moving object to move to a meeting position determined based on the presumed user.

6. A method of controlling a mobile object including a communication device that communicates with a communication device of a user and a camera that images a surrounding portion of the mobile object, the method comprising:
acquiring, from the communication device of the user and by the communication device, first utterance information by the user;
specifying a predetermined region according to a mark included in the first utterance information;
acquiring a captured image captured around the specified predetermined region;
acquiring a movement direction of the user from the first utterance information, and set a probability distribution indicating probabilities that the user exists to each of a plurality of regions, wherein the plurality of regions are areas that have been divided from the predetermined region;
analyzing the captured image and extract a feature of one or more candidate users and each feature of the one or more candidate users;

generating a question inquiring a feature of the user based on the extracted one or more candidate users and each feature, and send the generated question;

acquiring, from a communication device of the user and by the communication device, second utterance information for the question and by the user;

presuming the user based on the set probability distribution, the extracted feature of one or more persons, and the second utterance information, and controlling the moving object to move to a meeting position determined based on the presumed user.

* * * * *